United States Patent [19]

Sharma et al.

[11] Patent Number: 5,162,399
[45] Date of Patent: Nov. 10, 1992

[54] INK MILLBASE AND METHOD FOR PREPARATION THEREOF

[75] Inventors: Mahendra K. Sharma; Hieu D. Phan, both of Kingsport, Tenn.

[73] Assignee: Eastman Kodak Company, Rochester, N.Y.

[21] Appl. No.: 638,929

[22] Filed: Jan. 9, 1991

[51] Int. Cl.⁵ ............ C08J 3/20; C08K 5/01; C08L 33/04
[52] U.S. Cl. ............ 523/351; 524/88; 524/513; 524/514; 524/601; 524/602
[58] Field of Search ......... 524/88, 513, 514, 601, 524/602; 523/351

[56] References Cited

U.S. PATENT DOCUMENTS

| | | | |
|---|---|---|---|
| 3,546,008 | 12/1970 | Shields et al. | 117/138.8 |
| 3,734,874 | 5/1973 | Kibler et al. | 260/29.2 |
| 3,779,993 | 12/1973 | Kibler et al. | 260/75 |
| 4,335,220 | 6/1982 | Coney | 523/414 |
| 4,340,519 | 7/1982 | Kotera et al. | 523/414 |
| 4,395,500 | 7/1983 | Löhr et al. | 523/221 |
| 4,623,680 | 11/1986 | Azarnia et al. | 523/412 |
| 4,704,309 | 11/1987 | Coney et al. | 427/258 |
| 4,738,785 | 4/1988 | Langston et al. | 210/738 |
| 4,847,316 | 7/1989 | Schick et al. | 524/539 |
| 4,883,714 | 11/1989 | Stockl et al. | 524/602 |
| 4,921,899 | 5/1990 | Phan et al. | 524/513 |
| 4,939,233 | 7/1990 | Jenkins et al. | 528/272 |
| 4,946,932 | 8/1990 | Jenkins | 528/272 |
| 4,996,252 | 2/1991 | Phan et al. | 524/88 |

*Primary Examiner*—Paul R. Michl
*Assistant Examiner*—U. K. Rajguru
*Attorney, Agent, or Firm*—Betty J. Deaton; William P. Heath, Jr.

[57] ABSTRACT

Disclosed is a process for preparing ink millbase by use of a polymer blend of compatible polyesters and acrylic polymers. The polyesters are water-dispersible as a result of sulfonate groups on the polyester backbone. Use of the polymer blend results in an improvement in pigment particle size reduction during grinding.

18 Claims, No Drawings

INK MILLBASE AND METHOD FOR PREPARATION THEREOF

FIELD OF INVENTION

The present invention concerns a method for preparation of ink millbases by grinding pigment in the presence of a polyester/acrylic polymer blend.

BACKGROUND OF THE INVENTION

The composition and process of preparing polymer blends from a water-dispersible or dissipatable polyester and an acrylic polymer are disclosed in an application of Mahendra K. Sharma filed even date herewith entitled "Process for Preparing Blends of Polyesters and Acrylic Polymers", incorporated herein by reference in its entirety. It has been demonstrated that such polymer blends exhibit certain improved properties as compared to use of polyester alone. Prior art of interest includes U.S. Pat. Nos. 4,704,309; 4,738,785; 4,883,714 and 4,847,316 which relate to aqueous ink compositions containing water-dispersible polyesters. U.S. Pat. No. 4,623,680 teaches a method of preparing polymer blends from ammonium or amine salt of a carboxyl functional acrylic copolymer mixed with phenolplast resins useful as a can coating composition. The polyepoxide resins are partially reacted with a monofunctional acid group and, optionally, an epoxidized hydrocarbon or vegetable oil.

U.S. Pat. No. 4,395,500 by Gernot and Rolf discloses a method of preparing polymer blend of styrene and esters of acrylic or methacrylic acid. The aqueous resin solution provides a bimodal particle size distribution with 10 weight % of particles having an average diameter of less than 0.2 $\mu$m and of 90 weight % of particles having an average diameter of more than 0.25 $\mu$m. The ratio of average grain size of coarse to fine polymer is at least 2:1. These resin dispersions are claimed to be suitable especially as binders in plasters and gloss paints.

U.S. patent application No. 225,520 relates to an ink composition containing a blend of a polyester and an acrylic polymer. It was observed that the water-dispersible polyester material, when mixed with an acrylic polymer, can provide good water resistance and good block resistance without sacrifice of the advantages of water-dispersible polyester alone. This polymer blend was used to formulate water-based inks, overprints, and ink primers.

U.S. Pat. No. 4,921,899 discloses an ink composition containing a blend of a polyester, an acrylic polymer and a vinyl polymer. The water-based inks containing the blend of these polymers as a binder can significantly improve ink film properties such as alcohol resistance, block resistance and water resistance as compared to use of water-dispersible polyester alone. The polymer blends were also employed to prepare ink primers and overprint varnishes. However, these polymer blends were prepared by mixing an aqueous polyester dispersion with an acrylic emulsion which contains surfactants and other additives. The presence of surfactants in the ink formulations creates several problems related to ink stability, printing process and print quality of the ink film.

The previous work as described above relates to the composition of polymer blends, process of preparing these blends and their use in the formulation of water-based inks. The use of aqueous polymer blends containing a polyester and an acrylic polymer in pigment grinding is disclosed in the present invention. These pigment millbases and formulated water-based inks exhibit many desirable properties such as superior adhesion, wetting of printed substrates, flow-out, lay, scuff resistance, water-resistance, gloss and blocking temperature.

SUMMARY OF THE INVENTION

The present invention is directed to a process for preparing an ink millbase comprising grinding a pigment in the form of aggregates having an average particle size greater than about 100 $\mu$m in the presence of an aqueous fluid and a polymer blend wherein said polymer blend comprises about 1 to about 50 weight % of an acrylic polymer and about 50 to about 99 weight % of a water dispersible polyester material having carbonyloxy linking groups in the linear molecular structure wherein up to 80% of the linking groups may be carboxylamido linking groups, the polyester having an inherent viscosity of from about 0.1 to about 0.5 measured in a 60/40 parts by weight solution of phenol/tetrachloroethane at 25° C. and at a concentration of 0.25 grams of polymer in 100 mL of the solvent, the polyester containing substantially equimolar proportions of acid equivalents (100 mol %) to hydroxy and amino equivalents (100 mol %), the polyester comprising the reaction products of (a), (b), (c) and (d) from the following components or ester forming or ester-amide forming derivatives thereof:

(a) at least one difunctional dicarboxylic acid;
(b) from about 4 to about 25 mol %, based on a total of all acid, hydroxyl and amino equivalents being equal to 200 mol %, of at least one difunctional sulfomonomer containing at least one metal cationic group attached to aromatic nucleus wherein the functional groups are hydroxy, carboxyl, or amino;
(c) at least one difunctional reactant selected from a glycol or a mixture of a glycol and diamine having two —NRH groups, the glycol containing two —CH$_2$—OH groups; and
(d) from none to at least one difunctional reactant selected from a hydroxycarboxylic acid having one —CR$_2$—OH group, an aminocarboxylic acid having one —NHR group, and an amino-alcohol having one —CH$_2$—OH group and one —NHR group, or mixtures of said difunctional reactants, wherein each R is an H atom or an alkyl group of 1 to 4 carbon atoms; wherein the size of the pigment aggregates becomes reduced to an average particle size of less than about 50 $\mu$m.

The present invention is also directed to an ink millbase comprising:

(A) about 10 to about 60 weight % of pigment having an average particle size of less than about 50 $\mu$m,
(B) about 20 to about 80 weight % of an aqueous fluid, and
(C) about 10 to about 30 weight % of a polymer blend comprising about 1 to about 50 weight % of an acrylic polymer and about 50 to about 99 weight % of a water dispersible polyester material having carbonyloxy linking groups in the linear molecular structure wherein up to 80% of the linking groups may be carboxylamido linking groups, the polyester having an inherent viscosity of from about 0.1 to about 0.5 measured in a 60/40 parts by weight solution of phenol/tetrachloroethane at 25° C. and at a concentration of 0.25 grams of polymer in 100 mL of the solvent, the polyester containing substantially equimolar proportions of acid equivalents (100 mol %) to hydroxy and amino equivalents (100 mol %), the polyester comprising the reaction products of (a), (b), (c) and (d) from the following components or ester forming or ester-amide forming derivatives thereof:

(a) at least one difunctional dicarboxylic acid;
(b) from about 4 to about 25 mol %, based on a total of all acid, hydroxyl and amino equivalents being equal to 200 mol %, of at least one difunctional sulfomonomer containing at least one metal cationic group attached to aromatic nucleus wherein the functional groups are hydroxy, carboxyl, or amino;
(c) at least one difunctional reactant selected from a glycol or a mixture of a glycol and diamine having two —NRH groups, the glycol containing two —CH$_2$—OH groups; and
(d) from none to at least one difunctional reactant selected from a hydroxycarboxylic acid having one —CR$_2$—OH group, an aminocarboxylic acid having one —NHR group, and an amino-alcohol having one —CH$_2$—OH group and one —NHR group, or mixtures of said difunctional reactants, wherein each R is an H atom or an alkyl group of 1 to 4 carbon atoms.

DESCRIPTION OF THE INVENTION

Whenever the term "water-dispersible" or "water-dissipatable" is used herein, it will be understood to refer to the activity of a water or aqueous solution on the applicable polymer. The term is specifically intended to cover those situations wherein the solution dissolves and/or disperses the polymer material therein and/or therethrough.

The polyester and the acrylic polymer useful in the present invention are compatible with each other. By the term "compatible" is meant that a 60/40 weight blend of acrylic polymer/polyester (a blend with more acrylic polymer) at a 25% solids content in water will not gel or have a significant increase in viscosity after being held at 120° F. (48.89° C.) for 24 hours. By the term "gel" is meant that the blend is not pourable at room temperature. A significant increase in viscosity after 24 hours at 48.89° C. is typically at least two or three times the viscosity at zero time.

In the grinding method of the present invention, it is preferred wherein said pigment is present in an amount of about 10 to about 60 weight %, said aqueous fluid is present in an amount of about 20 to about 80 weight %, and said polymer blend is present in an amount of about 10 to about 30 weight %, said percentages being based on the total weight of pigment/aqueous fluid/polymer blend.

More preferred is wherein said pigment is present in an amount of about 20 to about 40 weight %, said aqueous fluid is present in an amount of about 30 to about 60 weight %, and said polymer blend is present in an amount of about 15 to about 20 weight %, said percentages being based on the total weight of pigment, aqueous fluid and polymer blend.

Also, in the grinding method it is preferred that the aqueous fluid comprises 80–100 weight % water and 0–20 weight % of a C$_1$–C$_4$ alcohol. The most preferred C$_1$–C$_4$ alcohol is n-propanol.

The temperature for the grinding method is not critical and can vary considerably, for example a temperature range of about 0° C. to about 100° C. can be employed. A preferred temperature range is about 15° C. to about 70° C.

In the ink millbase of the present invention, it is preferred that component (A) is present in an amount of about 20 to about 40%, component (B) is present in an amount of about 30 to about 60%, and component (C) is present in an amount of about 15 to about 20%.

The ink millbase of the invention can optionally contain one or more other additives commonly used in the pigment grinding art in an amount, for example, of about 0.001 to about 20%, preferably about 0.01 to about 10%, based on the total weight of the composition. Some of the additives include waxes such as Jonwax 26, Jonwax 120 (available from S.C. Johnson and Sons, Inc., Racine, Wis. 43403, U.S.A.), or Vanwax 35 (available from Vantage, Garfield, N.J. 07026, U.S.A.); surfactants such as Surfynol 104 and Surfonyl 440 (available from Air Products and Chemicals, Allentown, Pa. 18105, U.S.A.); modifiers (for example, defoamers) such as WBT-409, Resolv (available from Vantage), Carbowet 990 (available from Vantage), OT-70 aerosol (available from McIntyre, Chicago, Ill. 60632, U.S.A.), Foamaster 111 (available from Henkel Corporation, Morristown, N.J. 07960, U.S.A.); other alcohols such as propylene glycol, ethylene glycol monobutyl ether, or ethylene glycol, biocides; pH stabilizers; dispersants; thickeners such as Acrysol RM-825 (available from Rohm & Haas, Philadelphia, Pa. 19105, U.S.A.); and the like.

The type of grinding useful herein can be any type of grinding commonly used in the ink millbase art. The grinding equipment useful for carrying out the present process should be capable of stirring, milling, or otherwise mixing to achieve the desired reduction of particle size. For example, the grinding can be accomplished by use of a ball mill, colloid mill, sand mill, netzsch mill, K.D. mill, or the like. The grinding time will vary depending on the type of equipment employed, temperature, and the like; however, a grinding time of about 1 to about 4 hours is typical to achieve the desired level of particle size reduction. For laboratory-scale volumes, grinding may be conveniently accomplished by shaking the pigment, aqueous blend, and polymer blend with glass beads for about 1 hour to about 4 hours on a paint shaker. After grinding the millbase optionally can be filtered through a filter of large pore size, for example cheese cloth, in order to remove the glass beads if they are employed.

To break down the pigment aggregates sufficient forces must be exerted by one or more means to overcome the forces holding the aggregates together such as: (1) by physical impact, (2) by particle-particle attrition, and/or (3) by shear transmitted through an intermediate fluid layer. Usually most of the size reduction is accomplished by shear transmitted through the fluid layer surrounding the aggregate or by impingement of the aggregate against a hard surface. As appreciated by a skilled artisan, for any given type of grinding equipment the conditions and amounts of components will vary in order to achieve the desired level of particle reduction.

The average particle size of the pigment aggregates before grinding is greater than about 100 μm and after grinding is typically less than 50 μm, preferably less than 1 μm.

It is a particularly advantageous feature of the invention that small particle sizes are accomplished by use of the polymer blend, rather than use of the polyester alone. Thus, it is preferred that the average particle size of pigment using the grinding process of the invention is at least 10% smaller as compared to a control process using polyester alone in place of the polymer blend; more preferred is at least 50% smaller.

Exemplary useful C.I. pigments for use in the present invention are given in the following table:

| Pigments | |
|---|---|
| Generic Name | C.A. Index/Chemical Name |
| C.I. Pigment Yellow 17 | Butanamide, 2,2',-[(3,3'-dichloro[1,1'-biphenyl] 4,4'-diyl)bis(azo)bis [N-(2-methoxyphenyl)-3-oxo- |
| C.I. Pigment Blue 27 | Ferrate (4-1), hexakis (cyano-C)-ammonium iron (3+)(1:1:1) |
| C.I. Pigment Red 49:2 | 1-Naphthalenesulfonic acid, 2-[(2-hydroxy-1-naphthalenyl)azo]-, calcium salt (2:1) |
| C.I. Pigment Red 81:1 | Benzoic acid, 2,-[6-ethyl-amino)-3-(ethylimino)-2,7-dimethyl-3H-xanthen-9-yl]-, ethyl ester, w/molybdenum tungsten hydroxide oxide phosphate |
| C.I. Pigment Red 81:3 | Benzoic acid, 2-[6-ethyl-amino)-3-ethylimino)-2,7-dimethyl-3H-xanthen-9-yl]-, ethyl ester, molybdate-silicate |
| C.I. Pigment Red 81:x | Benzoic acid, 2-[6-(ethyl-amino)-3-(ethylimino)-2,7-dimethyl-3H-xanthen-9-yl]-, ethyl ester, molybdate-phosphate |
| C.I. Pigment Yellow 83 | Butanamide, 2,2'-[(3,3'-dichloro[1,1'-biphenyl]-4,4'-diyl)bis(azo)bis[N-(4-chloro-2,5-dimethoxy-phenyl)-3-oxo- |
| C.I. Pigment Red 57:1 | 2-Naphthalenecarboxylic acid, 3-hydroxy-4 [(4-methyl-2-sulfophenyl)azo]-, calcium salt (1:1) |
| C.I. Pigment Red 49:1 | 1-Naphthalenesulfonic acid, 2-[(2-hydroxy-1-naphthalenyl)azo]-, barium salt (2:1) |
| C.I. Pigment Violet 23 | Diindolo[3,3',2'm] triphenodioxazine, 8,18-dichloro-5,15-diethyl-5,15-dihydro- |
| C.I. Pigment Green 7 | C.I. Pigment Green 7 |
| C.I. Pigment Blue 61 | Benzenesulfonic acid, [[4-[[4-phenylamino)-phenyl]-[4-(phenylimino)-2,5-cyclohexadien-1-ylidene]methyl]-phenyl] amino]- |
| C.I. Pigment Red 48:1 | 2-Naphthalenecarboxylic acid, 4-[(5-chloro-4-methyl-2-sulfophenyl)azo]-3-hydroxy-, barium salt (1:1) |
| C.I. Pigment Red 52:1 | 2-Naphthalenecarboxylic acid, 4-[(4-chloro-5-methyl-2-sulfophenyl)azo]-3-hydroxy-, calcium salt (1:1) |
| C.I. Pigment Violet 1 | Ethanaminium, N-[9-(2-carboxyphenyl)-6-(diethyl-amino)-3H-xanthen-3-ylidene]-N-ethyl-, molybdatetungstate-phosphate |
| C.I. Pigment White 6 | Titanium oxide (TiO$_2$) |
| C.I. Pigment Blue 15 | Copper, [29H, 31H-phthalocyaninato (2-)-N$^{29}$, N$^{30}$, N$^{31}$, N$^{32}$]-, (Sp-4-1)- |

-continued

| Pigments | |
|---|---|
| Generic Name | C.A. Index/Chemical Name |
| C.I. Pigment Yellow 12 | Butanamide, 2,2'-[(3,3'-dichloro[1,1'-biphenyl]-4,4'-diyl)bis(azo)]bis[3-oxo-N-phenyl- |
| C.I. Pigment Blue 56 | Benzenesulfonic acid, 2-methyl-4-[[4-[[4-[(3-methylphenyl)amino] phenyl]-[4-[(3-methyl-phenyl)-imino)-2-5-cyclohexadien-1-ylidene]methyl]-phenyl] amino]- |
| C.I. Pigment Orange 5 | 2-Naphthalenol, 1-[(2,4-dinitrophenyl)azo]- |
| C.I. Pigment Black 7 | Carbon black |
| C.I. Pigment Yellow 14 | Butanamide, 2,2'-[(3,3'-dichloro[1,1'-biphenyl]-4,4'-diyl)bis(azo)]bis-[N-(2-methylphenyl)-3-oxo- |
| C.I. Pigment Red 48:2 | 2-Naphthalenecarboxylic acid, 4-[(5-chloro-4-methyl-2-sulfophenyl)-azo]-3-hydroxy-, calcium salt (1:1) |
| C.I. Pigment Blue 15:3 | Copper, [29H, 31H-phthalocyaninato (2-)-N$^{29}$, N$^{30}$, N$^{31}$, N$^{32}$]-, (SP-4-1)- |
| C.I. Pigment Yellow 1 | Butanamide, 2-[(4-methyl-2-nitrophenyl)azo]-3-oxo-N-phenyl- |
| C.I. Pigment Yellow 3 | Butanamide, 2-[(4-chloro-2-nitrophenyl) azo]-N-(2-chlorophenyl)-3-oxo- |
| C.I. Pigment Yellow 13 | Butanamide, 2,2'-[(3,3'-dichloro[1,1'-biphenyl]-4,4'-diyl)bis(azo)]bis [N-(2,4-dimethylphenyl)-B-oxo- |
| C.I. Pigment Orange 16 | Butanamide, 2,2'-[(3,3'-dimethoxy[1,1'-biphenyl]-4,4'-diyl)bis(azo)]bis [3-oxo-N-phenyl- |
| C.I. Pigment Yellow 55 | Butanamide, 2,2'-[(3,3'-dichloro[1,1'-biphenyl] -4,4'-diyl)bis(azo)]bis [N-(4-methylphenyl)-3-oxo- |
| C.I. Pigment Red 41 | 3H-Pyrazol-3-one,4,4'-[(3,3'-dimethoxy[1,1'-biphenyl]-4,4'-diyl)bis (azo)]bis[2,4-dihydro-5-methyl-2-phenyl- |
| C.I. Pigment Orange 34 | 3H-Pyrazol-3-one, 4,4'-[(3,3'-dichloro[1,1'-biphenyl]-4,4'-diyl)bis (azo)]bis[2,4-dihydro-5-methyl-2-(4-methylphenyl)- |
| C.I. Pigment Blue 62 | 4,4'-Bis(diethylamino) benzophenone condensed with N-ethyl-1-naphthyl-amine in toluene with phosphorous oxychloride and converted to the copper ferrocyanide salt (PTMA salt in P.Blue 1) |
| C.I. Pigment Red 22 | 2-Naphthalenecarboxamide, 3-hydroxy-4-[(2-methyl-5-nitrophenyl)azo]-N-phenyl- |
| C.I. Pigment Red 170 | 2-Naphthalenecarboxamide, 4-[[(4-(aminocarbonyl) phenyl]azo]-N-(2-ethoxy-phenyl)-3-hydroxy- |
| C.I. Pigment Red 88 | Benzo[b]thiophen-3(2H)-one, 4,7-dichloro-2-(4,7-dichloro-3-oxobenzo[b]- |

-continued

| Pigments | |
|---|---|
| Generic Name | C.A. Index/Chemical Name |
| C.I. Pigment Yellow 151 | thien-2(3H)-ylidene)- A diazotized aniline derivative coupled with an acetoacetyl derivative of 5-aminobenzimidazolone |
| C.I. Pigment Red 184 | A diazotized substituted aniline coupled with a derivative of 3-hydroxy-2-naphthanilide |
| C.I. Pigment Blue 1:2 | Ethanaminium, N-[4-[[4-(diethylamino)phenyl][4-(ethylamino)-1-1 naphthalenyl]methylene]-2,5-cyclohexadien-1-ylidene]-N-ethyl-, [orthosilicato(4-)] hexatriacontaoxo-dodecamolybdate(4)-(4:1) |
| C.I. Pigment Red 3 | 2-Naphthalenol, 1-[(4-methyl-2-nitrophenyl)azo]- |
| C.I. Pigment Blue 15:1 | Copper,[29H,32H-phthalocyaninato(2-)-$N^{29},N^{30},N^{31},N^{32}$]-,(SP-4-1)- or Copper,[chloro-29H, 31H-phthalocyaninato(2-1)-$N^{29},N^{30},N^{31},N^{32}$]- |
| C.I. Pigment Red 23 | 2-Naphthalenecarboxamide, 3-hydroxy-4-[(2-methoxy-5-nitrophenyl)azo]-N-(3-nitrophenyl)- |
| C.I. Pigment Red 112 | 2-Naphthalenecarboxamide, 3-hydroxy-N-(2-methylphenyl)-4-[(2,4,5-trichlorophenyl)azo]- |
| C.I. Pigment Yellow 126 | A tetrazotized derivative of 3,3-dichlorobenzidene coupled with a derivative of acetoacetanilide |
| C.I. Pigment Red 169 | 3-Ethylamino-p-cresol condensed with phthalic anhydride, esterified with ethanol and a mineral acid, and converted to the copper ferrocyanide complex (chloride salt is C.I. Basic Red 1, PTMA salt is P.Red 81:1). |
| C.I. Pigment Orange 13 | 3H-Pyrazol-3-one, 4,4'-[(3,3'-dichloro [1,1'-biphenyl]-4,4'-diyl)bis(azo)]bis[2,4-dihydro-5-methyl-2-phenyl- |
| C.I. Pigment Red 10 | 2-Naphthalenecarboxamide, 4-[(2,5-dichlorophenyl) azo]-3-hydroxy-N-(4-methylphenyl)- |
| C.I. Pigment Blue 1:X | Ethanaminium, N-[4-[[4-(diethylamino)phenyl][4-(ethylamino)-1-naphthalenyl]methylene]-2,5-cyclohexadien-1-ylidene]-N-ethyl-, molybdate-phosphate |
| C.I. Pigment Yellow 42 | Iron oxide ($Fe_2O_3$) hydrate |
| C.I. Pigment Red 101 | Iron oxide ($Fe_2O_3$) |
| C.I. Pigment Brown 6 | Iron oxide ($Fe_2O_3$), some FeO and $Fe_2O_3.H_2O$ |
| C.I. Pigment Brown 7 | Iron oxide ($Fe_2O_3$) plus varying amounts of clay |
| C.I. Pigment Brown 7:X | $Fe_2O_3.xMnO_2$ with varying amounts of clay |
| C.I. Pigment Black 11 | $FeO.Fe_2O_3$ |
| C.I. Pigment Metal 1 | Aluminum |
| C.I. Pigment Metal 2 | Copper, zinc |

In accordance with the present invention, ink compositions prepared from the above ink millbases may be superior over prior aqueous ink compositions in one or more properties such as pigment wetting, pigment stability, temperature stability (heat and freeze-thaw), non-settling for extended periods of time, nonpolluting with respect to odor and volatile organics, non-flocculating, long "open" time in the press fountain, wide viscosity range inks, adhesion to a variety of substrates, hardness, gloss, drying rate on substrates, film-forming properties at low temperatures without organic co-solvents, resistance to grease, water and scuff, compatibility with other water-based inks, wet rub resistance, ink mileage characteristics (considerable water dilution allowable at the press), ink press stability in general, printability (clean, sharp transfer without "stringing or misting"), trapping, easy clean up, nonplugging of printing plates, flexibility, redispersibility or rewetting, crinkle resistance, solvent resistance, alkali, chemical and detergent resistance, blocking resistance, lightfastness, heat resistance, slip angle, coefficient of friction, toughness, substrate wetting, hold-out, opacity, dry-rate, and no offset on the printing press (coating, e.g., on tension rollers).

The polymer blend useful herein is preferably prepared by a process comprising the steps of (A) contacting substantially dry acrylic polymer with a solubilizing amount of an alkaline solution comprising an amine or ammonium compound dissolved in water so as to achieve an acrylic polymer solution having a pH of at least about 10, (B) heating the acrylic polymer solution formed by step (A) at a sufficient temperature to result in an acrylic polymer solution having a pH of less than about 9, (C) contacting the acrylic polymer solution formed by step (B) with a water dispersible polyester material having carbonyloxy linking groups in the linear molecular structure wherein up to 80% of the linking groups may be carboxylamido linking groups, the polymer having an inherent viscosity of from about 0.1 to about 0.5 measured in a 60/40 parts by weight solution of phenol/tetrachloroethane at 25° C. and at a concentration of 0.25 grams of polymer in 100 mL of the solvent, the polymer containing substantially equimolar proportions of acid equivalents (100 mol %) to hydroxy and amino equivalents (100 mol %), the polymer comprising the reaction products of (a), b), (c) and (d) from the following components or ester forming or esteramide forming derivatives thereof:

(a) at least one difunctional dicarboxylic acid;

(b) from about 12 to about 25 mol %, based on a total of all acid, hydroxyl and amino equivalents being equal to 200 mol %, of at least one difunctional sulfomonomer containing at least one metal cationic group attached to aromatic nucleus wherein the functional groups are hydroxy, carboxyl, or amino;

(c) at least one difunctional reactant selected from a glycol or a mixture of a glycol and diamine having two —NRH groups, the glycol containing two —CH$_2$—OH groups; and (d) from none to at least one difunctional reactant selected from a hydroxycarboxylic acid having one —CR$_2$—OH group, an aminocarboxylic acid having one —NHR group, and an amino-alcohol having one —CH$_2$—OH group and one —NHR group, or mixtures of said difunctional reactants, wherein each R is an H atom or an alkyl group of 1 to 4 carbon atoms, said contacting occurring under agitation and at a sufficient temperature of about 80° C. to about 99° C. to result in a polymer blend wherein the polyester is substantially completely dispersed in the acrylic polymer solution, and the weight ratio of acrylic polymer:polyester is about 1:99 to about 50:50, (D) cooling the polymer blend composition of step (C) to a temperature range of about 45° C. to less than about 80° C, wherein a $C_1$–$C_4$ alcohol or a mixture of a $C_1$–$C_4$ alcohol and propylene glycol is added at a concentration of about 2 to about 10% of the ultimate total polymer blend composition, (E) further cooling the polymer blend composition of step (C) to less than about 45° C, wherein the acrylic polymer is compatible with the polyester.

In the preferred process for preparing polymer blends, it is preferred that the temperature for step (B) is about 70° C. to about 95° C. It is more preferred wherein the temperature for step (A) is about 18° C. to about 50° C, the temperature for step (B) is about 90° C. to about 95° C, the temperature for step (C) is about 85° C. to about 95° C, the temperature for step (E) is about 15° C. to about 25° C, and the pH of the acrylic polymer solution for step (A) is about 10 to about 11.

It is preferred that the weight ratio of acrylic polymer:polyester is about 1:99 to about 40:60. It is more preferred that the weight ratio of acrylic polymer:polyester is about 10:90 to about 35:65.

The Brookfield viscosity of the polymer blend composition formed by step (E) is about 30 cp to about 1,000 cp as measured at 30 rpm, more preferred is about 50 cp to about 500 cp as measured at 30 rpm. Brookfield viscosity can be determined according to ASTM Procedure 02196.

Regarding step (D) of the preferred polymer blend process, it is preferred that about 4 to about 8% of a $C_1$–$C_4$ alcohol is added or a mixture of about 4 to about 8% of a $C_1$–$C_4$ alcohol and about 1 to about 5% of propylene glycol is added, said percentages being based on the total weight of the polymer blend composition. More preferred is wherein about 2 to about 4% of propylene glycol is added. Preferred $C_1$–$C_4$ alcohols include n-propanol, isopropanol, ethanol, and the like.

For step (A) of the process for preparing polymer blends, it is preferred that the amine moiety or ammonium moiety is present in an amount of about 0.02 to about 3.0 weight %, based on the total weight of the polyester plus acrylic polymer. Examples of amine or ammonium compounds included are a mixture of compounds such as ammonium hydroxide, methyl amine, methyl ethyl amine, and the like.

In the process for preparing polymer blends, it is preferred that the polymer blend composition produced by step (E) contains about 5 to about 50 weight % solids; and the dry polymer blend has an I.V. of about 0.05 to about 0.30 as determined by ASTM Method D2857-70, an acid number of about 20 to about 100 and a Tg as measured by DSC of about 20° C. to about 120° C. More preferred is wherein the polymer blend composition produced by step (E) contains about 15 to about 40 weight % solids; and the polymer blend has an I.V. of about 0.1 to about 0.2, an acid number of about 35 to about 80, and a Tg of about 25° C. to about 100° C.

The polyesters of the invention are water-dispersible as a result of sulfonate groups on the polyester backbone. Suitable compositions are those described in U.S. Pat. Nos. 3,734,874, 3,546,008, 4,335,220 and 3,779,993, incorporated herein by reference. Basically, these polyesters and polyesteramides are described as having carbonyloxy interconnecting groups in the linear molecular structure wherein up to 80% thereof may be carbonylamido linking groups, the polymer having an inherent viscosity of at least about 0.1. It has been discovered that polyesters containing less than 12 mol % of a difunctional sulfomonomer will not function properly in the preferred process for preparing polymer blends in that acrylic blends made therefrom will not be stable. Thus, 12 to about 25 mol % of said sulfomonomer is typically employed with 15–25 mol % being preferred and 17–20 mol % being more preferred. However, if other processes are used for preparing the polyester/acrylic polymer blends (e.g., as taught in Ser. No. 225,520), about 4 to about 25 mol % of sulfomonomer can be used.

The inherent viscosities (I.V.) of the particular polyester materials useful herein typically range from about 0.1 to about 1.0 determined according to ASTM D2857-70 procedure, in a Wagner Viscometer of Lab Glass, Inc. of Vineland, N.J., having a ½ mL capillary bulb, using a polymer concentration about 0.25% by weight in 60/40 by weight of phenol/tetrachloroethane. The procedure is carried out by heating the polymer/solvent system at 120° C. for 15 minutes, cooling the solution to 25° C. and measuring the time of flow at 25° C. The I.V. is calculated from the equation $$\frac{(\eta) \; 25° \; C.}{0.50\%} = \frac{\ln \frac{t_s}{t_o}}{C}$$

where:
$(\eta)$ = inherent viscosity at 25° C. at a polymer concentration of 0.25 g/100 mL of solvent;
ln = natural logarithm;
$t_s$ = sample flow time;
$t_o$ = solvent-blank flow time; and
C = concentration of polymer in grams per 100 mL of solvent = 0.25.

The units of the inherent viscosity throughout this application are in deciliters/gram. It is noted that higher concentrations of polymer, e.g., 0.50 g of polymer/100 mL solvent may be employed for more precise I.V. determinations.

The dicarboxylic acid component of the polyester comprises aliphatic dicarboxylic acids, alicyclic dicarboxylic acids, aromatic dicarboxylic acids, or mixtures of two or more of these acids. Examples of such dicarboxylic acids include succinic; glutaric; adipic; azelaic; sebacic; itaconic; 1,4-cyclohexanedicarboxylic; phthalic; terephthalic and isophthalic.

It should be understood that use of the corresponding acid anhydrides, esters, and acid chlorides of these acids is included in the term "dicarboxylic acid."

Other suitable acids are disclosed in U.S. Pat. No. 3,779,993.

The difunctional sulfomonomer component of the polyester may advantageously be a dicarboxylic acid or an ester thereof containing a metal sulfonate group or a glycol containing a metal sulfonate group or a hydroxy acid containing metal sulfonate group. The metal ion of the sulfonate salt may be $Na^+$, $Li^+$, $K^+$ and the like. The resulting polyesters or polyesteramides are less readily dissipated by cold water and more readily dissipated by hot water. It is possible to prepare the polyester or polyesteramide using, for example, a sodium sulfonate salt and later by ion-exchange replace this ion with a different ion, and thus alter the characteristics of the polymer. The difunctional monomer component may also be referred to as a difunctional sulfomonomer and is further described hereinbelow.

Advantageous difunctional sulfomonomer components are those wherein the sulfonate salt group is attached to an aromatic acid nucleus such as benzene, naphthalene, diphenyl, oxydiphenyl, sulfonyldiphenyl or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters; metallosulfoaryl sulfonate as described in U.S. Pat. No. 3,779,993. The difunctional sulfomonomer is preferably present in an amount of about 12 to about 25 mol %.

Particularly superior results are achieved when the difunctional sulfo-monomer component is 5-sodiosulfoisophthalic acid or its esters and the glycol is a mixture of ethylene glycol or 1,4-cyclohexanedimethanol with diethylene glycol.

When the sulfonate-containing difunctional monomer is an acid or its ester, the polyester should contain at least 8 mol % of said monomer based on total acid content. Total acid content is calculated as the sum of (1) moles of component (a) namely dicarboxylic acids, (2) one-half of the moles of carboxyl-containing compounds of component (d), (3) moles of component (c) which are dicarboxylic acids, and (4) one-half of the moles of component (c) which are monocarboxy-containing compounds.

Adequate water-dispersible polyesters can be prepared without any poly(ethylene glycol) such as those described in U.S. Pat. No. 4,340,519, incorporated herein by reference in its entirety. Nevertheless, in a preferred form of the present invention, at least part of the glycol component, preferably at least 10 mol %, contains repeating units of a poly(ethylene glycol) of the formula H$-$(OCH$_2$—CH$_2$)$_n$OH wherein n is an integer of 1 to 4, preferably 2 to 4.

Other useful glycols for preparing copolyesters may consist of aliphatic, alicyclic, and aralkyl glycols. Examples of these glycols include ethylene glycol; propylene glycol; 1,3-propanediol; 2,4-dimethyl-2-ethylhexane-1,3-diol; 2,2-dimethyl 1,3-propanediol; 2-ethyl-2-butyl-1,3-propanediol; 2-ethyl-2-isobutyl-1,3-propanediol; 1,3-butanediol, 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol.

More preferably, the polyester comprises an acid component of from about 75 to about 84 mol % isophthalic acid and conversely from about 25 to about 16 mol % 5-sodiosulfoisophthalic acid, and a glycol component of from about 45 to about 60 mol % diethylene glycol and conversely from about 55 to about 40 mol % 1,4-cyclohexanedimethanol or ethylene glycol. More preferably, the inherent viscosity of the polyester is from about 0.28 to about 0.35, the said acid component comprises from about 80 to about 83 mol % isophthalic acid and conversely from about 20 to about 17 mol % 5-sodiosulfoisophthalic acid, and the said glycol component comprises from about 52 to about 56 mol % diethylene glycol and conversely from about 48 to about 44 mol % 1,4-cyclohexanedimethanol.

Some polyesters useful in the present invention are commercially available, for example, Eastek-1100®, available from Eastman Chemical Products, Inc., Kingsport, Tenn. 37662, U.S.A.

The acrylic polymer useful in the present invention preferably comprises repeating units of the formula

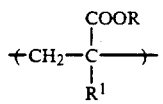

where R is H, a straight, branched, or cyclic alkyl group of 1 to 20 carbon atoms optionally substituted with up to 2 substituents selected from $C_1$–$C_6$ alkoxy and halogen and $R^1$ is H or methyl.

It is preferred that R is a straight, branched, or cyclic alkyl group of 1 to 10 carbon atoms optionally substituted with up to 2 substituents selected from $C_1$–$C_6$ alkoxy, chloro and bromo.

It is more preferred that R is H, methyl, ethyl, propyl, isopropyl, n-butyl, sec-butyl, isobutyl, tert-butyl, hexyl, heptyl, 2-ethylhexyl, 2-ethylbutyl, dodecyl, hexadecyl, 2-ethoxyethyl, or cyclohexyl.

It is preferred that the molecular weight of the acrylic polymer is about 5,000 to about 50,000, more preferably about 5,000 to about 25,000 and most preferably about 5,000 to about 20,000.

Also preferred is wherein the acrylic polymer has an acid number of about 100 to about 250, and a glass transition temperature of greater than about 0° C. More preferred is wherein said acrylic polymer has an acid number of about 150 to about 210 and wherein said acrylic polymer further contains styrene repeating units, acrylonitrile repeating units, or a mixture thereof.

Useful acrylic polymers that can be employed herein are commercially available by tradename "Joncryl" from S. C. Johnson and Sons, Inc., Racine, Wis. 43403, U.S.A., and "Vancryl" from Vantage.

After printing onto coated paper the millbases of the present invention exhibit excellent gloss. It is preferred that the gloss of the millbase on coated paper is at least 10% at 60°, more preferred is at least 20% at 60°. Also, the gloss on printed paper of the millbase of the invention at 60° is preferably at least 10% higher than a control millbase containing polyester in place of the polymer blend, more preferred is at least 50% higher. Gloss can be determined in accordance with ASTM Procedure D-1471.

The present invention will be illustrated by the following examples which should not be construed as a limitation upon the scope of the invention.

| Polyester Designation | IPA, Mol % | SIP, Mol % | DEG, Mol % | CHDM, Mol % | I.V. | Tg |
|---|---|---|---|---|---|---|
| A | 82 | 18 | 34 | 46 | .33 | 55 |

Where IPA = isophthalic acid
SIP = 5-sodiosulfoisophthalic acid
DEG = diethylene glycol
CHDM = 1,4-cyclohexanedimethanol
I.V. = inherent viscosity Joncryl-678 polymer is available from Johnson Wax and is an acrylic polymer having a molecular weight of 8,000, an acid number of 200, and a Tg of 85° C. Joncryl 67 is also available from Johnson Wax, and it is an acrylic polymer having a molecular weight of 10,000, an acid number of 190, and a Tg of 70° C.

Gloss was determined according to ASTM Procedure D-1471.

EXAMPLE 1

This example illustrates the preparation and composition of the millbase using polymer blends. These polymer blends contain Polyester A and an acrylic (i.e., Joncryl from Johnson Wax) polymers at a weight ratio of polyester/acrylic of 70/30 in an aqueous dispersion at 30 weight % solids level. An ink millbase is formulated by adding green pigment Copper Phthalo GR-274 0686 (e.g., sunfast Green 36) from Sun Chemical to diluted polymer blends. The mixture is then shaken with glass beads for four hours on a paint shaker. The mixture is filtered through cheese cloth. The millbase is stored in the plastic container. The composition of green millbase is as follows:

| Ingredients | Amount (g) | (%) |
| --- | --- | --- |
| Polymer Blend (Polyester A/Joncryl-67, 30% solids) | 250.0 | 50.0 |
| Green Pigment | 125.0 | 25.0 |
| Water | 125.0 | 25.0 |

EXAMPLE 2

The millbase prepared in accordance with Example 1 is characterized by measuring particle size and particle size distribution of the pigments. Results are as follows:

| % Relative Volume (Sample Size) | Particle Size (μm) |
| --- | --- |
| 10 | 0.38 |
| 50 | 2.16 |
| 90 | 13.47 |

The surface area measured by light scattering method (e.g., Microtrac Analyser, Leeds & Northrup Instruments, St. Petersburg, Fla., U.S.A.) is 5.51 m²/cc. The gloss of the millbase film on coated paper is 41.0 at 60°.

EXAMPLE 3

Example 1 is repeated with the exception that orange pigment (e.g., Orange 46; Clarion Red RC 1094-DC from Magruder) is used instead of green pigment. The composition of orange millbase is as follows:

| Ingredients | Amount (g) | (%) |
| --- | --- | --- |
| Polymer Blend (Polyester A/Joncryl-67, 30% solids) | 250.0 | 50.0 |
| Orange Pigment (Orange 46) | 125.0 | 25.0 |
| Deionized Water | 125.0 | 25.0 |

EXAMPLE 4

Example 2 is repeated with the exception that the millbase of Example 3 is used instead of green millbase of Example 1. The particle size and particle size distribution for orange millbase are as follows:

| % Relative Volume (Sample Size) | Particle Size (μm) |
| --- | --- |
| 10 | 0.53 |
| 50 | 0.60 |
| 90 | 2.08 |

The surface area is 11.38 m²/cc. The surface area for orange pigment is higher as compared to green pigment due to small particle size of orange millbase.

The gloss of orange millbase film on coated paper is 42.0 at 60°, which is close to the gloss of green millbase.

EXAMPLE 5

Example 3 is repeated with the exception that polyester (Polyester A from Eastman Chemical Company) polymer dispersion is used instead of polymer blend (e.g., Polyester A/Joncryl-67 in a ratio 70/30) for grinding orange pigment. The particle size and size distribution of orange millbase measured in accordance with Example 2 are as follows:

| % Relative Volume (Sample Size) | Particle Size (μm) |
| --- | --- |
| 10 | 0.36 |
| 50 | 1.01 |
| 90 | 3.26 |

The surface area is 7.67 m²/cc—considerably lower than that of the orange millbase containing polymer blend (e.g., Polyester A/Joncryl-67). An average pigment size is also large for orange millbase containing Polyester A polymer alone.

The gloss of the orange millbase on coated paper is 21.0 at 60°, which is considerably lower as compared to orange millbase containing polymer blend (Example 4).

EXAMPLE 6

Example 1 is repeated with the exception that polyester (Polyester A) polymer dispersion is used instead of polymer blend (e.g., Polyester A/Joncryl-67 in a ratio 70/30) for grinding green pigment. The millbase contains the following ingredients:

| Ingredients | Amount (g) | (%) |
| --- | --- | --- |
| Polyester (Polyester A) Dispersion, 30% solids | 250.0 | 50.0 |
| Sunfast Green 36 | 125.0 | 25.0 |
| Deionized Water | 125.0 | 25.0 |

The gloss of the green millbase film on coated paper is 11.0 at 60°, which is significantly lower compared to green millbase containing polymer blend of 70/30 Polyester A/Joncryl-67. This example illustrates that millbase containing polymer blend provides glossy green color film as compared to that of green millbase made by Polyester A polyester polymer alone.

EXAMPLE 7

This example illustrates the preparation of blue millbase using polyester (Polyester A) and an acrylic (Joncryl-678) polymer blend. The blue pigment used is PV Fast Blue B2G-A (Color Index Pigment Blue 15:3) from Hoechst Corporation. The polymer blend contains Polyester A/Joncryl-678 ratio 70/30.

For preparing blue millbase, pigment is added to diluted polymer blend with water. The mixture is then shaken using about equal weight of glass beads (about equal to ingredients weight) for 4 hours on a paint shaker. The material is filtered using cheese cloth. The millbase is stored in a plastic or glass container. The composition of the millbase is as follows:

| Ingredients | Amount (g) | (%) |
| --- | --- | --- |
| Polymer Blend (Polyester A/Joncryl-678, 30% Solids) | 250.0 | 50.0 |
| Blue Pigment (PV Fast Blue B2G-A) | 125.0 | 25.0 |
| Deionized Water | 125.0 | 25.0 |

The particle size and size distribution of pigment millbase are measured in accordance with Example 2. The data obtained are as follows:

| % Relative Volume (Sample Size) | Particle Size ($\mu m$) |
| --- | --- |
| 10 | 0.48 |
| 50 | 2.03 |
| 90 | 5.64 |

The surface area is 5.12 $m^2/cc$. The gloss of the millbase film on coated paper is 21.0 at 60°.

EXAMPLE 8

Example 7 is repeated with the exception that the polymer blend with Polyester A/Joncryl-678 ratio of 66/34 (30 weight % solids) is used instead of polymer blend with Polyester A/Joncryl-678 ratio of 70/30 in grinding blue pigment to prepare millbase.

The particle size and size distribution of pigment are as follows:

| % Relative Volume (Sample Size) | Particle Size ($\mu m$) |
| --- | --- |
| 10 | 0.56 |
| 50 | 3.50 |
| 90 | 8.83 |

The surface area is 3.66 $m^2/cc$. The gloss of the millbase film on coated paper is 18.0 at 60°.

EXAMPLE 9

Example 7 is repeated with the exception that the polymer blend with Polyester A/Joncryl-678 ratio of 75/25 (30 weight % solids) is used instead of Polyester A/Joncryl-678 ratio of 70/30 in grinding blue pigment to prepare millbase. The particle size and size distribution of the filtered millbase are as follows:

| % Relative Volume (Sample Size) | Particle Size ($\mu m$) |
| --- | --- |
| 10 | 0.61 |
| 50 | 3.27 |
| 90 | 9.17 |

The surface area is 3.35 $m^2/cc$. The gloss of the millbase film on coated paper is 18.0 at 60°.

EXAMPLE 10

Example 7 is repeated with the exception that the polyester (Polyester A) polymer dispersion (30 weight % solids) is used instead of polymer blend containing Polyester A/ Joncryl-678 in grinding blue pigment to prepare millbase.

The particle size and size distribution of the pigment are as follows:

| % Relative Volume (Sample Size) | Particle Size ($\mu m$) |
| --- | --- |
| 10 | 0.84 |
| 50 | 3.75 |
| 90 | 9.85 |

The surface area is 2.90 $m^2/cc$. The gloss of the millbase film formed on coated paper is 11.0 at 60°. The polyester polymer alone provides low gloss to the pigment millbase film.

EXAMPLE 11

This example illustrates the preparation of water-based ink using millbase as described in Example 7. The water-based ink is prepared by adding 50 g polymer blend (i.e., 30 weight % solids content of polymer blend) to the 50 g blue millbase. The composition of water-based ink is as follows:

| Ingredients | Amount (%) |
| --- | --- |
| Blue Pigment (PV Fast Blue B2G-A) | 12.5 |
| Polymer Blend (30% Solid) (Polyester A/Joncryl-678 = 70/30) | 75.0 |
| Water | 12.5 |

EXAMPLE 12

The water-based ink prepared in accordance with Example 11 is used for evaluating printing process parameters. The ink is applied on aluminum foil, polyester film and coated papers with number 3 and 6 Meyer rods. These samples are allowed to dry for 24 hours at ambient temperature or dried in the oven at 100° C. for 3 sec. The water resistance of the samples is determined by a water spot test. Distilled water drops are left for 5, 10, 15 and 20 minutes and then wiped off gently with a facial tissue. The integrity of the ink film is visually assessed. The water spot test is rated as follows:
 1. Poor: Total film removed
 2. Fair: Partial film removed
 3. Good: Dull or discolor film, but no removal
 4. Excellent: The film is substantially unchanged
The water resistance is excellent (i.e., a "4" rating) on all the substrates and at all sampling times.

EXAMPLE 13

The water-based ink prepared in accordance with Example 11 is tested for blocking resistance. The ink is applied on the substrates as described in Example 12. These samples are evaluated for blocking temperature using the PI Sentinel Heat Sealer at 40 psi for 5 sec. The samples are folded face-to-face printed surface, then placed under sealer at different temperatures. The test is repeated until the blocking occurs. The integrity of the printed film is visually assessed. The blocking resistance is rated as follows:

1. Poor: Picked and complete film removed
2. Fair: Picked, but partial film removed
3. Good: Slightly picked, but no film removed
4. Excellent: No picking and no film removed Blocking temperature is defined as the highest temperature where the printed ink retains a blocking resistance rating of greater than 3. The blocking temperature is in the range of 150°–160° F. (65.56°–71.11° C.) on the various substrates.

EXAMPLE 14

The water-based ink prepared in accordance with Example 11 also exhibits excellent wetting on aluminum foil, polymer film and paper. The ink shows excellent hardness, adhesion, gloss, drying, rewetting of printed cylinder and scuff resistance on different substrates.

EXAMPLE 15

The water-based ink prepared in accordance with Example 11 is evaluated for water-resistance in accordance with Example 12, and for block resistance in accordance with Example 13. The blue ink films also exhibit excellent water resistance and block resistance [e.g., blocking temperature between 140°–160° F. (60°–71.11° C.)]. The gloss of the ink film is measured about 20.0 at 60°.

EXAMPLE 16

Example 11 is repeated with the exception that polymer blend with 66/34 ratio of Polyester A/Joncryl-678 is used instead of 70/30 in preparing water-based inks using millbase of Example 8.

The gloss is 21.0 at 60°. The ink film exhibits excellent water resistance and blocking temperature e.g., 140°–160° F. (60°–71.11° C.)].

EXAMPLE 17

Example 11 is repeated with the exception that polymer blend with Polyester A/Joncryl-678 ratio 75/25 is used instead of 70/30 in formulating water-based ink using millbase of Example 9.

The gloss of ink film is 20.0 at 60°. The ink film exhibits excellent water resistance and blocking temperature [e.g., 140°–160° F. (60°–71.11° C.)].

EXAMPLE 18

Example 11 is repeated with the exception that polyester (Polyester A) polymer dispersion is used instead of Polyester A/Joncryl-678 polymer blend in formulating water-based ink using millbase of Example 10.

The gloss of the ink film is 16.0 at 60°, which is considerably lower than that of the ink films (gloss=21.0 at 60°) containing Polyester A/ Joncryl-678 polymer blends with different ratios. The water resistance of the ink film is poor, and blocking temperature [e.g., 100°–120° F. (37.78°–48.89° C.)] is significantly lower than that of the ink film [e.g., 140°–160° F. (60°–71.11° C.)] containing Polyester A/Joncryl-678 polymer blends with different ratios.

EXAMPLE 19

Example 11 is repeated with the exception that the green millbase (Example 1) is used instead of blue millbase (Example 7) for formulating water-based inks using Polyester A/Joncryl-67 polymer blend with 70/30 ratio.

The gloss of the ink film is 33.0 at 60° with excellent water resistance and blocking temperature [e.g., 140°–160° F. (60°–71.11° C.)].

EXAMPLE 20

Example 19 is repeated with the exception that Polyester A polyester polymer dispersion is used instead of Polyester A/Joncryl-67 polymer blend. The gloss is 10.0 at 60° with poor water resistance and blocking temperature [e.g., 100°–120° F. (37.78°–48.89° C.)].

EXAMPLE 21

Example 19 is repeated with the exception that orange millbase (Example 3) is used instead of green millbase (Example 1) for formulating water-based ink. The gloss of the ink film is 35.0 at 60° with excellent water resistance and blocking temperature [e.g., 140°–160° F. (60°–71.11° C.)].

EXAMPLE 22

Example 21 is repeated with the exception that the Polyester A polyester polymer dispersion is used instead of Polyester A/Joncryl-67 (70/30) polymer blend for formulating water-based ink. The gloss of the ink film is 14.0 at 60° with poor water resistance and blocking temperature [e.g., 100°–120° F. (37.78°–48.89° C.)].

The invention has been described in detail with particular reference to preferred embodiments thereof, but it will be understood that variations and modifications can be effected within the spirit and scope of the invention.

We claim:

1. A process for preparing an ink millbase comprising grinding a pigment in the form of aggregates having an average particle size greater than about 100 $\mu$m in the presence of an aqueous fluid and a polymer blend comprising about 1 to about 50 weight % of an acrylic polymer and about 50 to about 99 weight % of a water dispersible polyester material having carbonyloxy linking groups in the linear molecular structure wherein up to 80% of the linking groups may be carboxylamido linking groups, the polymer having an inherent viscosity of from about 0.1 to about 0.5 deciliters/gram measured in a 60/40 parts by weight solution of phenol/tetrachloroethane at 25° C. and at a concentration of 0.25 grams of polymer in 100 mL of the solvent, the polymer containing substantially equimolar proportions of acid equivalents (100 mol %) to hydroxy and amino equivalents (100 mol %), the polymer comprising the reaction products of (a), (b), (c) and (d) from the following components or ester forming or ester-amide forming derivatives thereof:

(a) at least one difunctional dicarboxylic acid;
(b) from about 4 to about 25 mol %, based on a total of all acid, hydroxyl and amino equivalents being equal to 200 mol %, of at least one difunctional sulfomonomer containing at least one metal cationic group attached to aromatic nucleus wherein the functional groups are hydroxy, carboxyl, or amino;
(c) at least one difunctional reactant selected from a glycol or a mixture of a glycol and diamine having two —NRH groups, the glycol containing two —CH$_2$—OH groups; and
(d) from none to at least one difunctional reactant selected from a hydroxycarboxylic acid having one —CR$_2$—OH group, an aminocarboxylic acid having one —NHR group, and an amino-alcohol having one —CH$_2$—OH group and one —NHR group, or mixtures of said difunctional reactants, wherein each R is an H atom or an alkyl group of 1 to 4 carbon atoms, wherein the size of the pigment aggregates becomes reduced to an average particle size of less than about 50 μm.

2. The method of claim 1 wherein said polyester material comprises about 12 to about 25 mol % of said difunctional sulfomonomer reactant (b) and wherein said difunctional reactant (c) of said polyester material contains at least 10 mol %, based on the total mol % of hydroxy or hydroxy and amino equivalents, of a poly(ethylene glycol) having the structural formula:

H—(OCH$_2$—CH$_2$)$_n$OH, n being an integer of between 1 and about 4.

3. The method of claim 1 wherein said pigment is present in an amount of about 10 to about 60 weight %, said aqueous fluid is present in an amount of about 20 to about 80 weight %, and said polymer blend is present in an amount of 10 to about 30 weight %, said percentages being based on the total weight of pigment/aqueous fluid/polymer blend.

4. The method of claim 1 wherein said pigment is present in an amount of about 20 to about 40 weight %, said aqueous fluid is present in an amount of about 30 to about 60 weight %, and said polymer blend is present in an amount of 15 to about 20 weight %, said percentages being based on the total weight of pigment/aqueous fluid/polymer blend.

5. The method of claim 1 wherein said aqueous fluid comprises 80-100 weight % water and 0-20 weight % of a C$_1$-C$_4$ alcohol.

6. The method of claim 1 carried out at a temperature of about 0° C. to about 100° C.

7. The method of claim 1 wherein said grinding is accomplished by use of a ball mill, a colloid mill, a sand mill, a netzsch mill or a K.D. mill.

8. The method of claim 1 wherein the molecular weight of the acrylic polymer is about 5,000 to about 50,000, and the weight ratio of acrylic polymer:polyester is about 10:90 to about 35:65.

9. The method of claim 1 wherein the molecular weight of the acrylic polymer is about 5,000 to about 20,000 and the polyester comprises an acid component of from about 75 to about 84 mol % isophthalic acid and conversely from about 25 to about 16 mol % 5-sodiosulfoisophthalic acid, and a glycol component of from about 45 to about 60 mol % diethylene glycol and conversely from about 55 to about 40 mol % 1,4-cyclohexanedimethanol or ethylene glycol.

10. The method of claim 1 wherein the inherent viscosity of the polyester is from about 0.28 to about 0.35, the said acid component comprises from about 80 to about 83 mol % isophthalic acid and conversely from about 20 to about 17 mol % 5-sodiosulfoisophthalic acid, and the said glycol component comprises from about 52 to about 56 mol % diethylene glycol and conversely from about 48 to about 44 mol % 1,4-cyclohexanedimethanol.

11. The method of claim 1 wherein the acrylic polymer has an acid number of about 100 to about 250, and a glass transition temperature of greater than about 0° C.

12. The process of claim 11 wherein said acrylic polymer has an acid number of about 150 to about 210 and wherein said acrylic polymer further contains styrene repeating units, acrylonitrile repeating units, or a mixture thereof.

13. The process of claim 1 wherein said acrylic polymer comprises repeating units of the formula

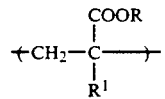

where R is H, a straight, branched, or cyclic alkyl group of 1 to 20 carbon atoms optionally substituted with up to 2 substituents selected from C$_1$-C$_6$ alkoxy and halogen and R$^1$ is H or methyl.

14. The process of claim 13 wherein R is a straight, branched, or cyclic alkyl group of 1 to 10 carbon atoms optionally substituted with up to 2 substituents selected from C$_1$-C$_6$ alkoxy, chloro and bromo.

15. The process of claim 13 wherein R is H, methyl, ethyl, propyl, isopropyl, n-butyl, sec-butyl, isobutyl, tert-butyl, hexyl, heptyl, 2-ethylhexyl, 2-ethylbutyl, dodecyl, hexadecyl, 2-ethoxyethyl, or cyclohexyl.

16. The method of claim 1 wherein said pigment is one or a mixture of the following color index materials: C.I. Pigment Yellow 17; C.I. Pigment Blue 27; C.I. Pigment Red 49:2; C.I. Pigment Red 81:1; C.I. Pigment Red 81:3; C.I. Pigment Red 81:x; C.I. Pigment Yellow 83; C.I. Pigment Red 57:1; C.I. Pigment Red 49:1; C.I. Pigment Violet 23; C.I. Pigment Green 7; C.I. Pigment Blue 61; C.I. Pigment Red 48:1; C.I. Pigment Red 52:1; C.I. Pigment Violet 1; C.I. Pigment White 6; C.I. Pigment Blue 15; C.I. Pigment Yellow 12; C.I. Pigment Blue 56; C.I. Pigment Orange 5; C.I. Pigment Black 7; C.I. Pigment Yellow 14; C.I. Pigment Red 48:2; C.I. Pigment Blue 15:3; C.I. Pigment Red 53:1; C.I. Pigment Yellow 42; C.I. Pigment Brown 6; C.I. Pigment Red 101; or C.I. Pigment Black 11.

17. The method of claim 1 wherein the average particle size of the pigment aggregate after grinding is less than about 1 μm.

18. The method of claim 1 wherein said polymer blend is formed by a process comprising the steps of:

(A) contacting substantially dry acrylic polymer with a solubilizing amount of an alkaline solution comprising an amine or ammonium compound dissolved in water so as to achieve an acrylic polymer solution having a pH of at least about 10, (B) heating the acrylic polymer solution formed by step (A) at a sufficient temperature to result in an acrylic polymer solution having a pH of less than about 9, (C) contacting the acrylic polymer solution formed by step (B) with a water dispersible polyester material having carbonyloxy linking groups in the linear molecular structure wherein up to 80% of the linking groups may be carboxylamido linking groups, the polymer having an inherent viscosity of from about 0.1 to about 0.5 measured in a 60/40 parts by weight solution of phenol/tetrachloroethane at 25° C. and at a concentration of 0.25 grams of polymer in 100 mL of the solvent, the polymer containing substantially equimolar proportions of acid equivalents (100 mol %) to hydroxy and amino equivalents (100 mol %), the polymer comprising the reaction products of (a), (b), (c) and (d) from the following components or ester forming or esteramide forming derivatives thereof:

(a) at least one difunctional dicarboxylic acid;

(b) from about 12 to about 25 mol %, based on a total of all acid, hydroxyl and amino equivalents being equal to 200 mol %, of at least one difunctional sulfomonomer containing at least one metal cationic group attached to aromatic nucleus wherein the functional groups are hydroxy, carboxyl, or amino;

(c) at least one difunctional reactant selected from a glycol or a mixture of a glycol and diamine having two —NRH groups, the glycol containing two —CH$_2$—OH groups; and (d) from none to at least one difunctional reactant selected from a hydroxycarboxylic acid having one —CR$_2$—OH group, an aminocarboxylic acid having one —NHR group, and an aminoalcohol having one —CH$_2$—OH group and one —NHR group, or mixtures of said difunctional reactants, wherein each R is an H atom or an alkyl group of 1 to 4 carbon atoms, said contacting occurring under agitation and at a sufficient temperature of about 80° C. to about 99° C. to result in a polymer blend wherein the polyester is substantially completely dispersed in the acrylic polymer solution, and the weight ratio of acrylic polymer:polyester is about 1:99 to about 50:50, (D) cooling the polymer blend composition of step (C) to a temperature range of about 45° C. to less than about 80° C., wherein a C$_1$-C$_4$ alcohol or a mixture of a C$_1$-C$_4$ alcohol and propylene glycol is added at a concentration of about 2 to about 10% of the ultimate total polymer blend composition, (E) further cooling the polymer blend composition of step (C) to less than about 45° C., wherein the acrylic polymer is compatible with the polyester.

* * * * *